United States Patent

Spaude

[11] Patent Number: 5,535,659
[45] Date of Patent: Jul. 16, 1996

[54] TRANSPOSITION RULE FOR MUSICAL THEORY

[76] Inventor: Hans-Martin Spaude, Haydnstrasse 11, 75242 Neuhausen-Hamberg, Germany

[21] Appl. No.: 539,810

[22] Filed: Oct. 5, 1995

Related U.S. Application Data

[63] Continuation of Ser. No. 237,144, May 3, 1994, abandoned.

[30] Foreign Application Priority Data

May 6, 1993 [DE] Germany .......................... 43 14 956.1

[51] Int. Cl.⁶ ........................... G09B 15/02; G06G 1/02
[52] U.S. Cl. .......................... 84/473; 84/471 SR; 84/480; 235/70 A
[58] Field of Search .................. 84/473, 474, 475, 84/471 SR, 480, 485 SR; 235/70 R, 70 A, 71 A

[56] References Cited

U.S. PATENT DOCUMENTS

| | | | |
|---|---|---|---|
| 1,783,361 | 12/1930 | Gibson | 84/473 |
| 3,592,099 | 7/1971 | Gibby | 84/474 |
| 4,289,057 | 9/1981 | Whitlock | 84/473 |
| 4,881,443 | 11/1989 | Bertram | 84/473 |

FOREIGN PATENT DOCUMENTS

| | | |
|---|---|---|
| 185862 | 9/1922 | Germany. |
| 1173904 | 12/1969 | Germany. |
| 7230521 | 8/1972 | Germany. |
| 2201834 | 7/1973 | Germany. |
| 3415736 | 5/1985 | Germany. |
| 8610124 | 10/1986 | Germany. |
| 4002361 | 8/1991 | Germany. |

*Primary Examiner*—Cassandra C. Spyrou
*Attorney, Agent, or Firm*—Friedrich Kueffner

[57] ABSTRACT

A transposition rule for musical theory for the visual indication of the sequence of notes of musical scales and/or chords in the various keys of a tone system. The transposition rule includes an elongated base member which is provided with fixed scales, wherein the scales include the notes of the tone system arranged with a uniform division, and replaceable sliding scales which are displaceably guided in the base member and are provided with the sequences of notes of the musical scale and of the chords in a division corresponding to the division of the fixed scales. The slide member is arranged in the base member in an on-edge position.

12 Claims, 4 Drawing Sheets

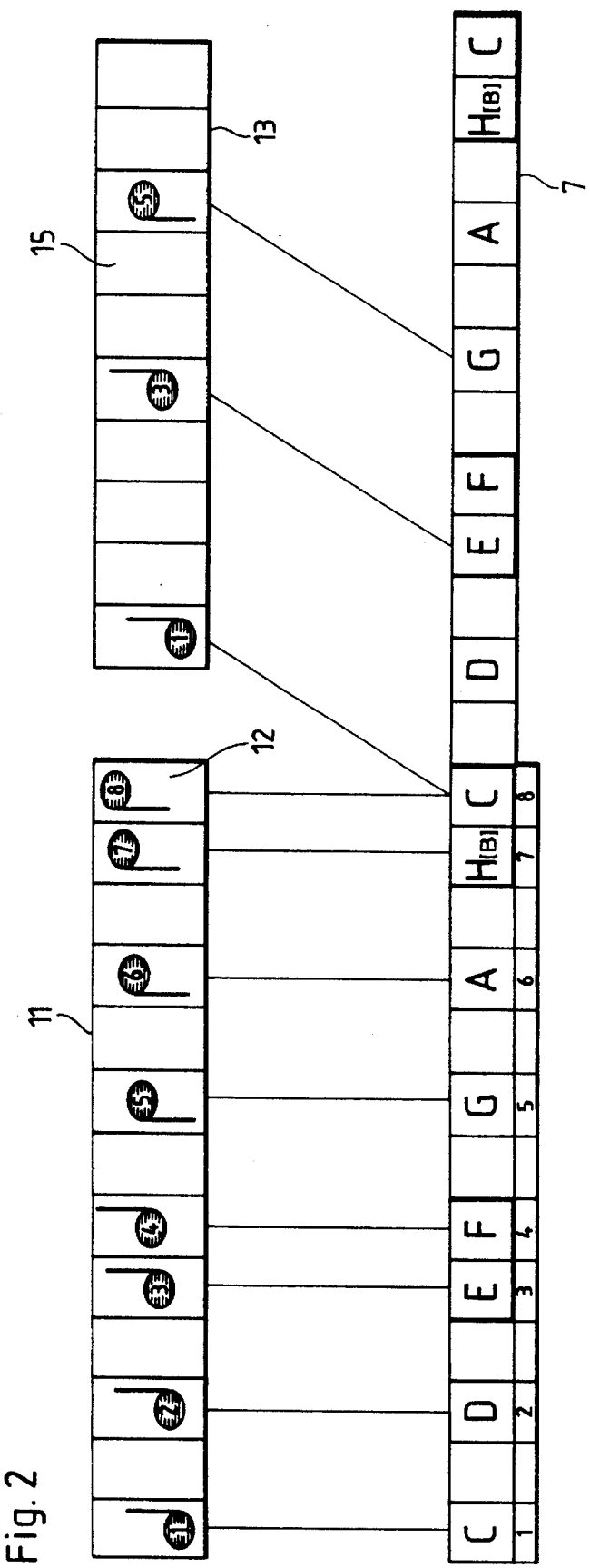
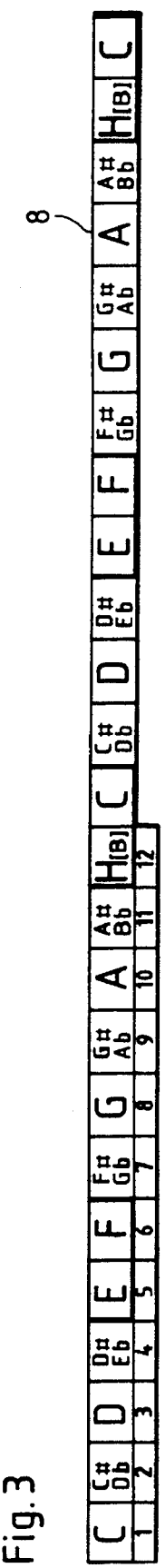
Fig. 2
Fig. 3

TRANSPOSITION RULE FOR MUSICAL THEORY

This is a continuation of application Ser. No. 08/237,144 filed May 3, 1994 now abandoned.

BACKGROUND OF THE INVENTION

1. Field of the Invention

The present invention relates to a transposition rule for musical theory for the visual indication of the sequence of notes of musical scales and/or chords in the various keys of a tone system. The transposition rule includes an elongated base member which is provided with fixed scales, wherein the scales include the notes of the tone system arranged with a uniform division, and replaceable sliding scales which are displaceably guided in the base member and are provided with the sequences of notes of the musical scale and of the chords in a division corresponding to the division of the fixed scales.

2. Description of the Related Art

A transposition rule of the above-described type is disclosed in British Patent 185 862. The transposition rule can be used as an educational aid for beginners as well as for advanced students and contributes to a better understanding of the relatively complicated spatial concept of the Western or Occidental tone culture which is based on the so-called diatonic tone system which is a 12-tone system of halftone steps. The scale based on this system includes eight tone steps, wherein the degrees from the third to the fourth tone step and from the seventh to the eighth tone step are halftone steps. The tone steps between all other degrees are whole-tone steps. Each composition which is written in a key which differs from the key of C must correspond to the sequence of whole-tone steps and halftone steps predetermined by the above-described scale system. Accordingly, the relatively complicated principle of having to fit 12 individual tones depending on the selected key into a system of tones with different spacings (musical scale) is not only difficult for beginners, but also for teachers who have to impart these frequently difficult relationships to students. This is also true with respect to active musicians who have to carry out complex mental efforts when constructing scales and chords, so that mistakes can frequently not be avoided. The above-described transposition rule can be of help in this connection.

Analogous to a slide rule, the known transposition rule has a tongue-like slide member which can be pulled out and reinserted or which can be exchanged against slide members with different scales. The base member of this transposition rule is provided on its upper side with fixed scales and it includes a dovetail-type guide means into which the tongue-shaped slide member can be inserted. However, as is the case in a slide rule, it is necessary to pull out the slide member over its entire length from the dovetail-type guide means at the end of the base member and, when reinserting the slide member or inserting another slide member, the slide member has to be inserted from the end of the base member into the dovetail-type guide means. Accordingly, when a slide member is inserted, the slide member projects by a large distance beyond the base member and, thus, requires a large free space for manipulating the slide member. As a result, when several students or users of the transposition rule sitting next to each, for example, in a classroom, simultaneously manipulate the slide members, the students or users will interfere with each other.

SUMMARY OF THE INVENTION

Therefore, it is the primary object of the present invention to provide a transposition rule of the above-described type in which the above-mentioned disadvantages are avoided. In particular, a transposition rule is to be provided which is simple to operate.

In accordance with the present invention, the above object is met in a surprisingly simple manner by arranging the slide member in the base member in an on-edge position.

The transposition rule according to the present invention still provides all the advantages which are inherent in a transposition rule for musical theory constructed in accordance with the slide-rule principle. Since the slide member is placed on edge, the transposition rule according to the present invention provides the additional advantage compared to known transposition rules that the removal and reinsertion or the exchange of the chord interval slide members are very simple, uncomplicated manipulations. This is because the slide members can be placed in the base member from above, so that no space is required beyond the ends of the base member, as it is an absolute requirement when inserting the tongue-like slide members from the ends in conventional transposition rules. Moreover, the insertion from above requires much less dexterity and requires less time than the insertion of a tongue-like slide member from the end into a dovetail-type guide means of the base member.

In accordance with a preferred embodiment of the invention, a slot-like guide groove is provided in at least one wide side of the base member. The guide groove extends in longitudinal direction between the fixed scales. The guide groove has a cross section which is essentially rectangular and the width of the guide groove is slightly greater than the width of the narrow side of the slide member. Since the slot-like guide groove which extends over the entire length of the base member has a width which is only insignificantly greater than the thickness of the slide member, a play exists between the slide member which has been inserted from above and the sides of the guide groove, so that the insertion of the slide member into the guide groove is made easier. The manner in which the transposition rule according to the present invention is used as an optical teaching and learning aid does not require that the slide member is carefully placed with a precise accurate fit in the guide groove.

In accordance with another proposal of the present invention, the guide groove may have an inclined configuration. In that case, it is possible that the slide member which has been inserted from above in the on-edge position is placed in the guide groove tilted slightly backwardly from the side of the observer, i.e., the slide member may assume a slightly inclined position in the base member in accordance with the inclination of the guide groove. This provides the observer with a more favorable field of view. The same effect could also be achieved in the case of a vertical guide groove if the groove has a greater width at the top than at the bottom, i.e., when the groove is constructed so as to narrow downwardly to the bottom of the groove.

In accordance with another advantageous feature, the slide members are provided on the two wide sides or flat sides thereof with different markings. As a result, by a simple reinsertion of the slide member, different tone sequences of the musical scale or of chords are available for the user of the transposition rule.

A further development of the present invention provides that two wide sides of the base member are provided with a vertical guide groove each, wherein the two wide sides are provided with fixed scales of different keys. Accordingly, the transposition rule is equipped in its basic configuration with several tone system scales and, if the base member has, for example, a polygonal cross section, such as, a triangular cross section or a square cross section, guide grooves can be provided on all three or four sides of the base member and fixed scales can be provided for the different keys on the sides of the base member, wherein the linearly displaceable and exchangeable slide members which are provided with musical scale or chord divisions can be used together with the fixed scales of the base member. By juxtaposing the scales, it is always possible to directly observe the tone sequence of the scale or of a chord.

In accordance with another feature of the present invention, the slide members are secured in the guide groove by means of magnetic force. Accordingly, a proposal of the invention provides that a magnetic strip or magnetic clamps are arranged in the groove bottom and/or on the narrow sides of the slide members. The magnetic force is dimensioned in such a way that it does not impair the linear displacement of the slide members in the base member which advantageously has a length which is approximately twice the length of the slide member. On the other hand, the magnetic force should prevent the slide member from falling out of the guide groove and the magnetic force should prevent the slide member from being displaced in the guide groove when the base member is slightly lifted or rotated about its longitudinal axis without prior removal of the slide member. If the slide member is of a non-magnetic material, for example, plastics material, it is also possible to provide, for example, a magnetic foil at the narrow sides thereof, wherein one of the narrow sides faces the groove bottom when the slide member is placed on-edge in the guide groove.

In accordance with another proposal of the invention, a note table, for example, for a violin clef or bass clef, is inserted on edge in the guide groove. This makes it possible optically to determine the names of the notes of the tones of the tone system arranged with uniform division on the fixed scales on both sides of the guide groove. In that case, it is recommended that the note table engages over the guide groove at both ends with locking projections, so that the note table cannot be displaced and assumes an unchangeable position relative to the fixed scales.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 2 shows on a larger scale a detail of the transposition rule of FIG. 1 with a C-key scale extending over two octaves to be fixedly attached to the base member, with musical scales and chords assigned to the C-scale being provided on scales of two replaceable slide members;

FIG. 3 shows a scale to be fixedly attached to the base member of the transposition rule of FIG. 1, wherein the scale extends over two octaves and includes all halftones and wholetones;

DETAILED DESCRIPTION OF THE PREFERRED EMBODIMENTS

Figure 1:
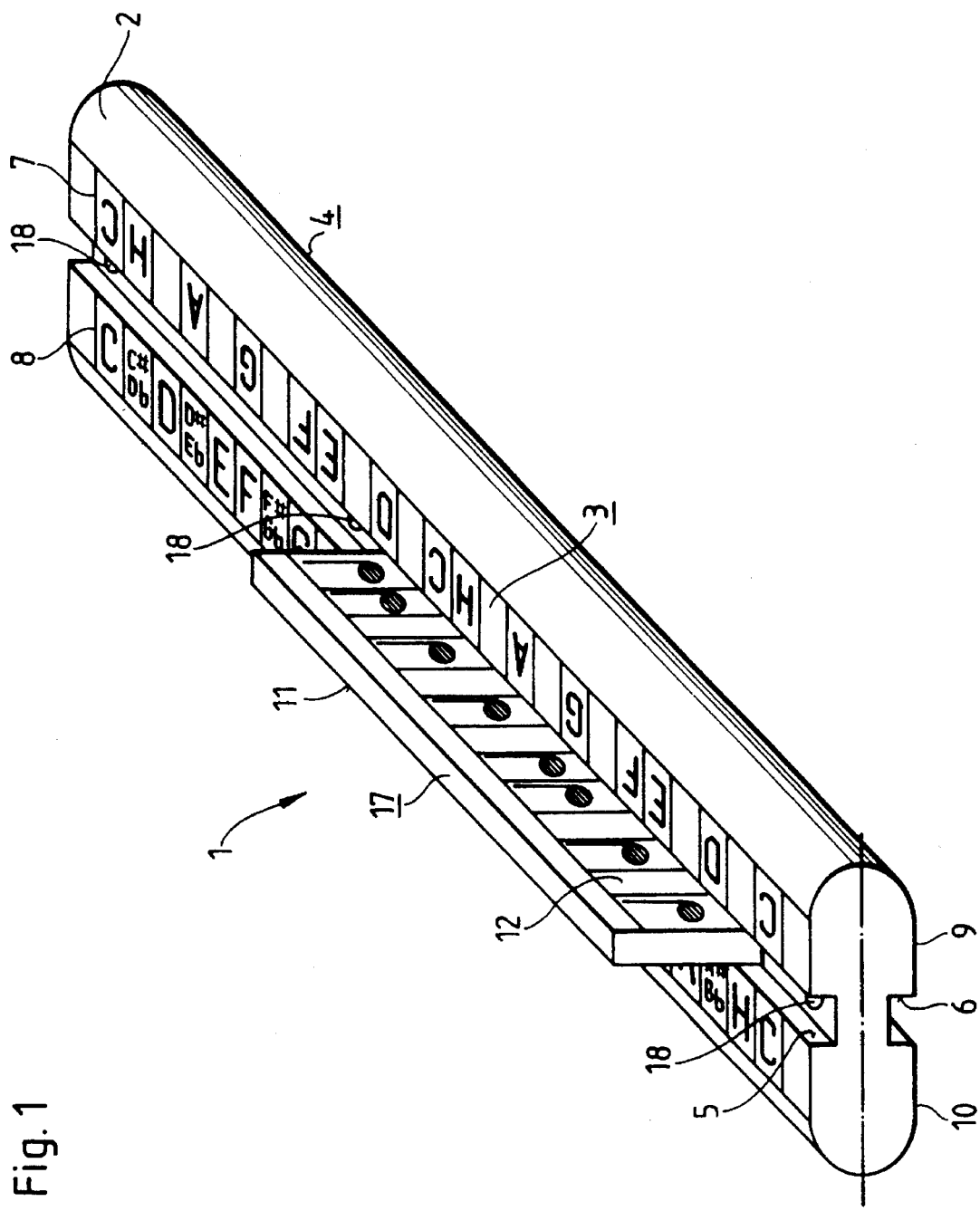
FIG. 1 is a perspective view of a transposition rule according to the present invention, with a slide member placed on edge in a guide groove of a base member.
Figure 4:
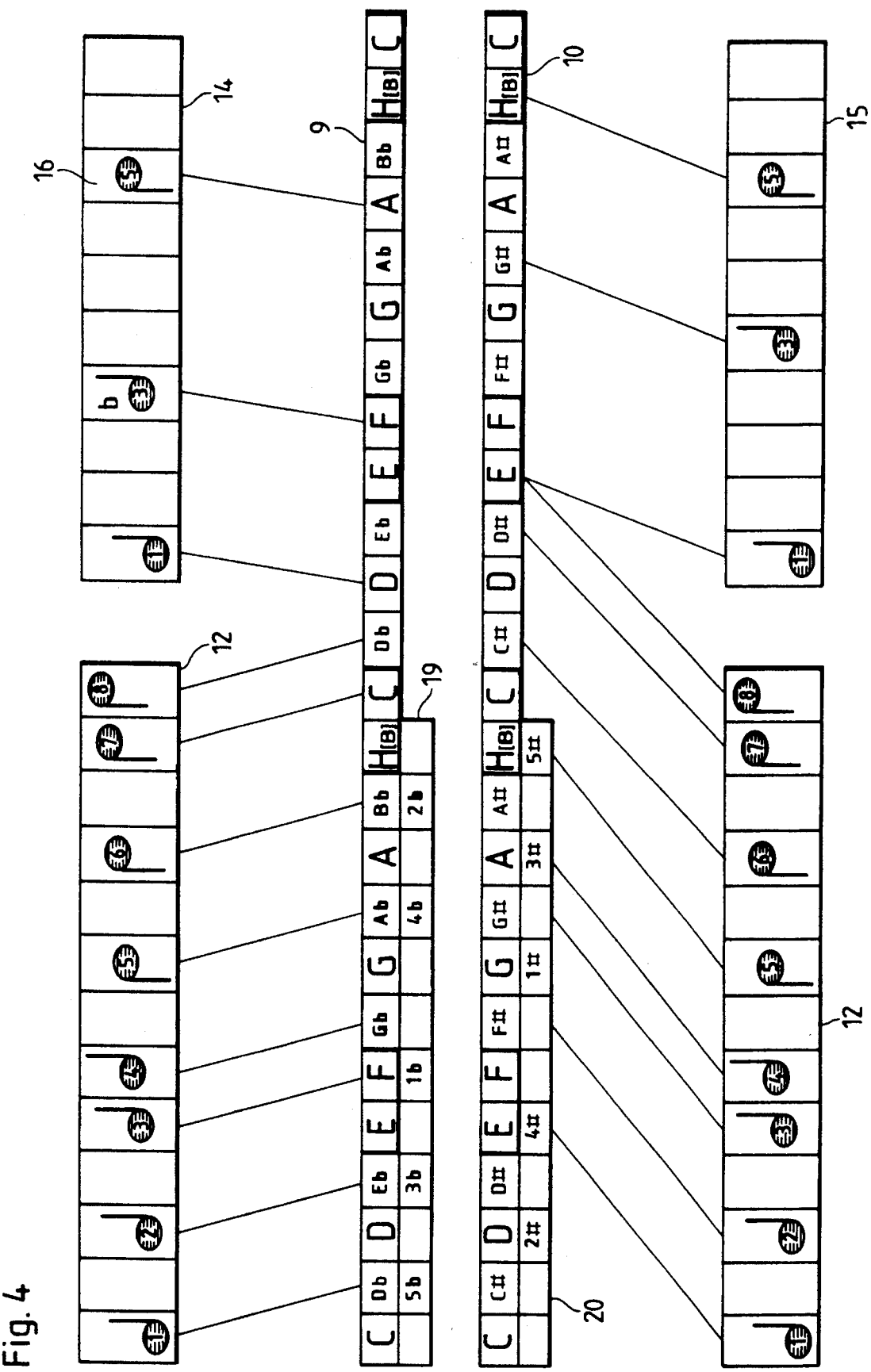
FIG. 4 shows modifications of scales to be fixedly attached to the base member of the transposition rule of FIG. 1, i.e., a b-key scale and a #-sign key or sharp key scale.

As illustrated in FIG. 1 of the drawing, a transposition rule 1 according to the present invention for the visual indication of the tone sequence of the diatonic tone system includes an elongated, flat base member 2. The base member 2 has on its upper wide sides 3 and 4 vertical guide grooves 5 and 6, respectively, which have an essentially rectangular cross section and extend over the entire length of the base member 2. To the left and to the right of the guide grooves 5 and 6 are arranged tone system scales 7, 8, as also shown in FIGS. 2 and 3 and tone system scales 9, 10, as also shown in FIG. 4. The tone system scales are fixedly attached to the base member 2 or may be releasably attached, for example, by means of an adhesive. The guide groove 5, and the guide groove 6 after the base member 2 has been turned about its longitudinal axis by 180°, serve to receive a slide member 11 which has a length which is substantially smaller than the length of the base member 2. Specifically, as shown in FIG. 1 of the drawing, the length of the base member 2 is approximately twice the length of the slide member 11. The slide member 11 is replaceable and longitudinally slidable in the guide grooves 5 or 6. On the side facing the user as shown in FIG. 1, the slide member 11 is provided with a musical scale 12, as they are also shown in FIGS. 2 and 4. As is the case in the slide member 11 shown in FIG. 1, the other slide members 13 and 14 shown in FIGS. 2 and 4, respectively, are also provided preferably on both sides with separate scales whose division is equal to the division of the fixed tone system scales 7 to 10 arranged on both sides of the guide grooves 5, 6. In addition to the slide member 11 having the musical scale 12, the drawing shows of the possible large number of chords on the slide members 13 and 14 only the basic or major chord, i.e., the scale 15 in FIG. 2 and the minor chord, i.e., the scale 16 in FIG. 4.

In order to utilize a desired musical scale or a desired chord scale, the slide member can be easily replaced as desired or removed and reinserted. This is because, as shown in FIG. 1, a slide member 11 or 13, 14 having the respective scale 12 or 15 or 16 can be easily placed from above into the guide groove 5 or 6 in an on-edge position without requiring space next to the ends of the base member 2. In the same manner, the slide member can be removed from the guide groove 5, 6. The guide grooves 5, 6 have a width which is slightly greater than the thickness of the slide members 11, 13, 14 which have the scales 12, 15, 16 on the wide sides thereof. As a result, the slide members 11, 13, 14 can be inserted with a slight play into the guide grooves 5 or 6. For securing the inserted slide member 11 or 13 or 14 in the on-edge position thereof, a magnetic strip or magnetic clamps 18 can be provided on the narrow sides 17 of the slide members 11, 13 or 14 or in the bottom of the guide grooves 5 or 6.

FIGS. 2, 3 and 4 show tone system scales 7 to 10 which, for simplicity's sake, are separated from the base member 2. FIGS. 2, 3 and 4 additionally show the corresponding separate scales, i.e., the musical scale 12 as well as the major chord and minor chord scales 15 and 16. The relationship between the scales 12, 15, 16 of the slide members 11, 12, 13 and the musical scales 7 to 10 attached to the base member 2 is illustrated by connecting lines.

As can be seen in detail in FIGS. 2 to 4, FIG. 2 shows a scale 7 which only includes the fundamental tones of the diatonic tone system and extends over two octaves. The musical scale 12 with the fundamental tone C is assigned to the scale 7. The tones C-D-E-F-G-A-H/B-C indicated on the tone system or musical scale 7 coincide with the tone sequence of the musical scale 12. The separate scale 15 provided on the slide member 13 shows the tone sequence of the major chord which, in an assumed slide member position corresponding to the illustration, is composed as a so-called triad of different fundamental tones, namely, C and the third fundamental tone E and the fifth fundamental tone G.

The tone system scale 8 shown in FIG. 3 which extends over two octaves has, in addition to the fundamental tones of the diatonic tone system, the intermediate halftones, of the b and # keys and makes the tonal congruence readily apparent. The resulting twelve-tone sequence forms the basis of the diatonic tone system.

FIG. 4 shows a b-tone system scale 9 and a #-tone system scale 10 which have been taken from the scale of FIG. 3. An additional scale 19 or 20 is assigned to the two key or system scales 9, 10, wherein, when the key of composition is determined, the number of the prefixes b or # (sharp) to be taken into consideration in this key can be taken from the scales. In accordance with the assignment of the musical scale 12 to the b-tone system scale 12 illustrated in the upper half of FIG. 4, the fundamental tone is Db. The adjacent scale 19 then shows that five prefixes must be taken into consideration in this case, as can be seen from the musical scale 12 adjusted to the fundamental tone Db. The separate scale 16 provided on one side of the slide member 14 and shown on the upper righthand side of FIG. 4 represents a minor chord. In the case of the fundamental tone D, the minor chord is composed of the tone sequence D-F-A.

In the same manner, the additional scale 20 assigned to the #-key scale 10 and shown in the lower half of FIG. 4 indicates the number of prefixes to be taken into consideration when determining a #-key. For example, when the #-key E major is selected, the scale 20 indicates that four prefixes are to be taken into consideration. This is confirmed by adjusting the musical scale 12 shown in the left bottom of FIG. 4 to the fundamental tone E. The separate scale 20 shown on the bottom right of FIG. 4 again indicates the tone sequence of the major chord which, in the assumed slide member position on the fundamental tone E, is composed of the tone sequence E-G # (gis)-H (B).

Figure 5:
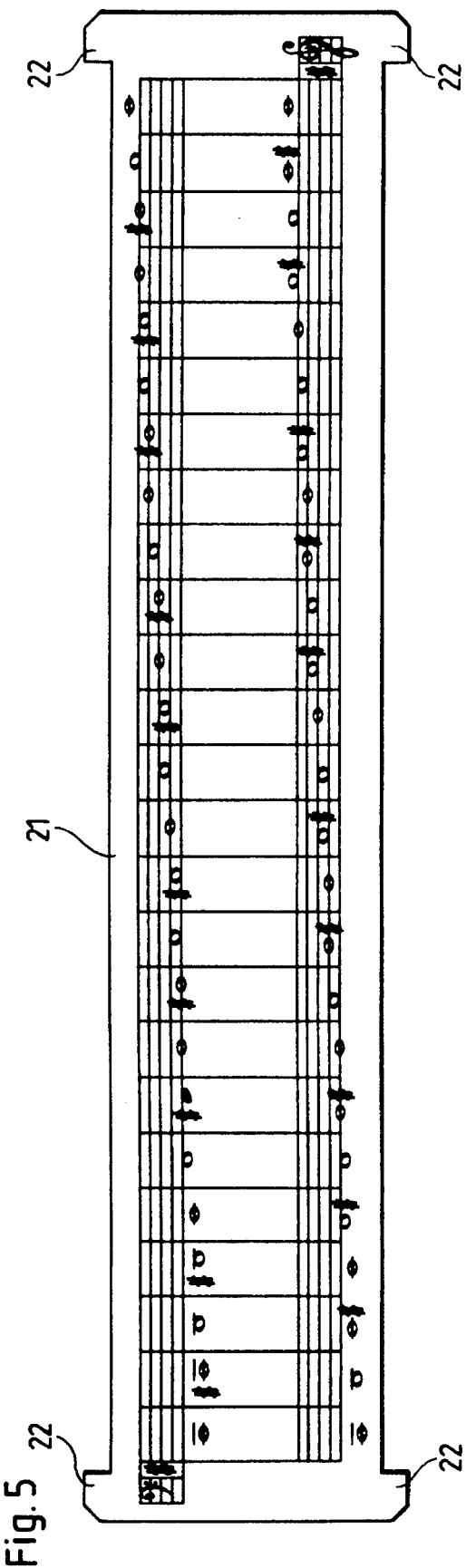
FIG. 5 is a top view of a note table.
Figure 5:
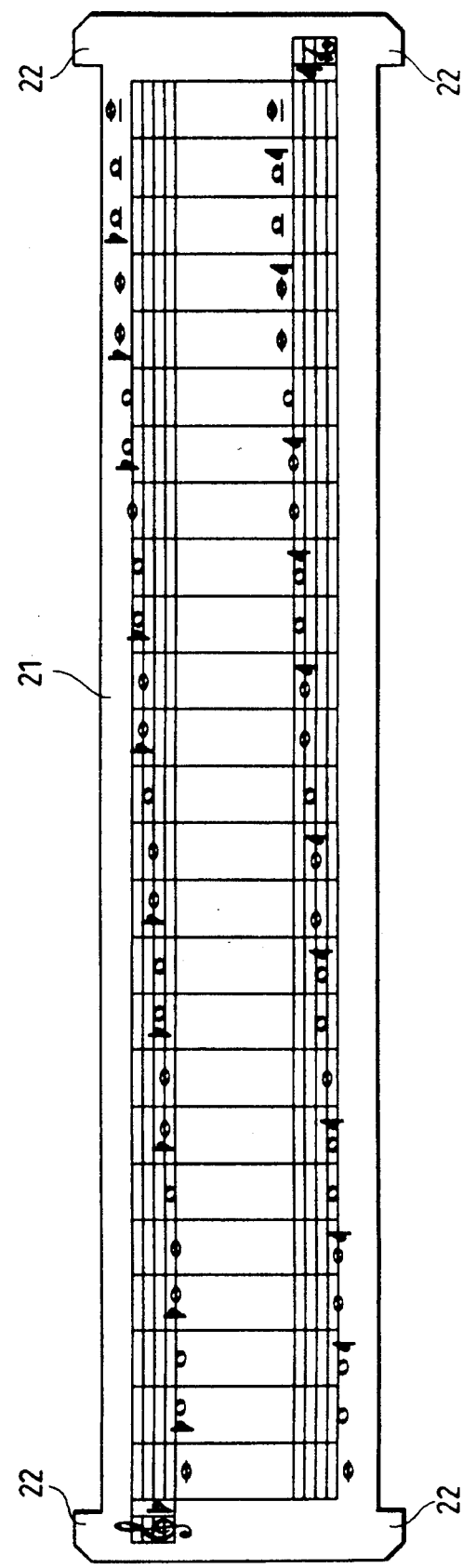

By utilizing a note table 21 as illustrated in FIG. 5, it is also possible to immediately determine optically the names of the notes determined by the respective adjusted position of the scales 12, 15, 16 provided on the slide members 13, 14. For this purpose, the note table 21 merely has to be inserted in an on-edge position into the guide groove 5 or 6. To prevent axial displacement of the note table 21, the note table 21 has locking projections 22 at the ends thereof, wherein, in the adjusted position, the locking projections 22 engage over the guide groove 5, 6 at both ends. In other words, the length of the note table 21 between the locking projections 22 located opposite each other in longitudinal direction corresponds approximately to the length of the guide groove 5, 6 and, thus, to the length of the base member 2 of the transposition rule 1. The note table 21 can also be replaced and/or removed and reinserted.

The invention is not limited by the embodiments described above which are presented as examples only but can be modified in various ways within the scope of protection defined by the appended patent claims.

I claim:

1. A transposition rule for musical theory for a visual indication of a tone sequence of scales and/or chords in various keys of a tone system having tones, the transposition rule comprising an elongated base member, the base member having fixed scales comprising the tones of the tone system arranged with a uniform division, and at least one slide member, the slide member having scales with tone sequences of a musical scale and chords arranged in a division corresponding to the division of the fixed scales, the slide member having an axis, the base member comprising slide member guide means, the slide member having narrow sides and wide sides and being axially slidably and replaceably received in the slide member guide means, the slide member being placed in the slide member guide means in an upright position with one of the narrow sides facing downwardly into the slide member guide means and the slide member protruding upwardly away from said one of the narrow sides and out of the base member.

2. The transposition rule according to claim 1, wherein the slide member has a rectangular cross section.

3. The transposition rule according to claim 2, wherein the base member has an essentially polygonal cross section with sides, the slide member guide means comprising a slot-shaped guide groove extending in at least one of the sides of the base member between the fixed scales, the guide groove having an essentially rectangular cross section, wherein the guide groove has a width which is slightly greater than a width of the narrow side of the slide member facing downwardly into the slide member guide means.

4. The transposition rule according to claim 2, wherein the slide member has the musical scale and an additional scale on the wide sides thereof, and wherein the musical scales on the wide sides of the slide member are different from each other.

5. The transposition rule according to claim 3, wherein guide grooves are provided in the sides of the base member, wherein the fixed scales of the base member are provided for the keys, and wherein the keys are different from each other.

6. The transposition rule according to claim 3, further comprising magnetic means for securing the slide member in the guide groove.

7. The transposition rule according to claim 6, wherein the magnetic means is one of a magnetic strip or magnetic clamps.

8. The transposition rule according to claim 6, wherein the guide groove has a bottom, and wherein the magnetic means is provided in the guide groove bottom.

9. The transposition rule according to claim 6, wherein the magnetic means is provided on one of the narrow sides of the slide member.

10. The transposition rule according to claim 3, further comprising a note table placed in an on-edge position in the guide groove.

11. The transposition rule according to claim 10, wherein the note table comprises locking projections, the guide groove having two ends, the locking projections engaging the ends of the guide groove.

12. The transposition rule according to claim 1, wherein the base member and the slide member have a length, and wherein the length of the base member is at least twice the length of the slide member.

* * * * *